UNITED STATES PATENT OFFICE.

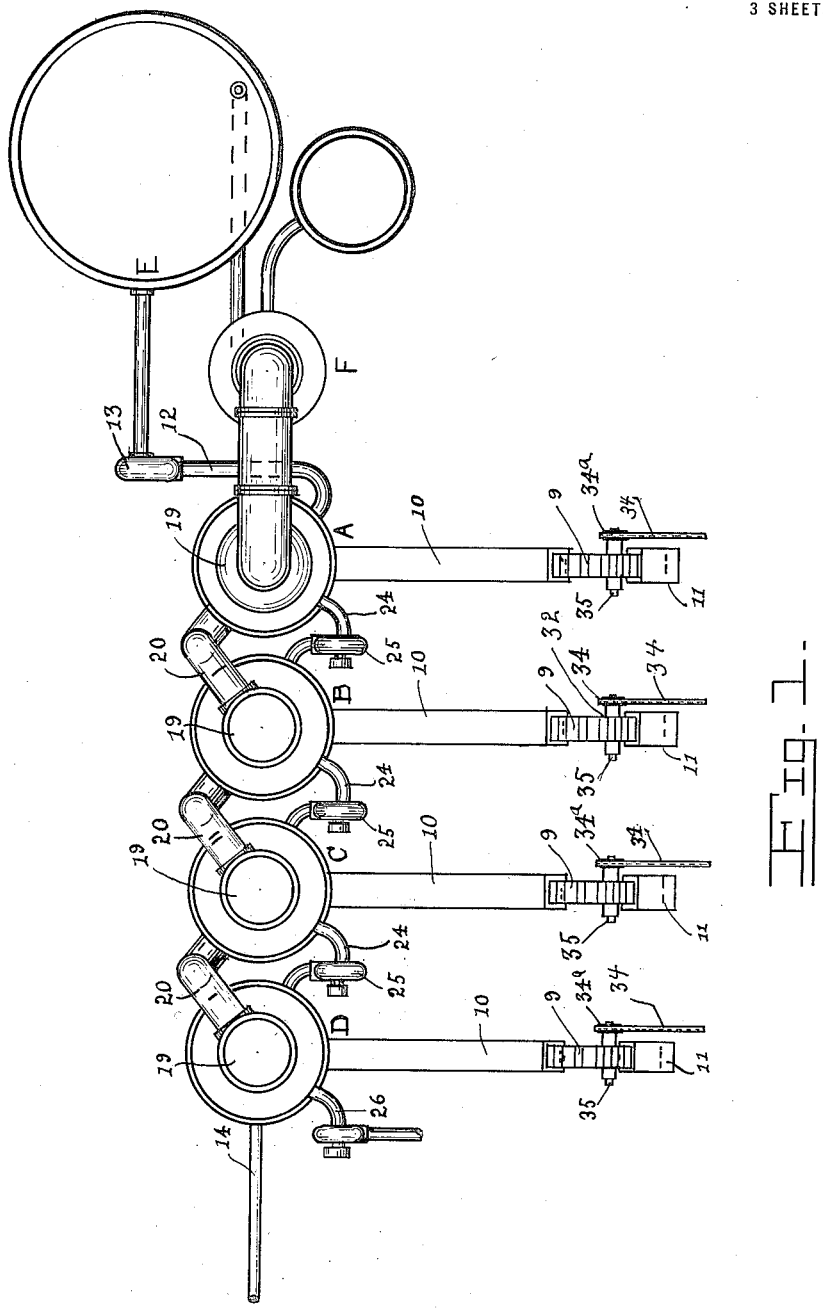

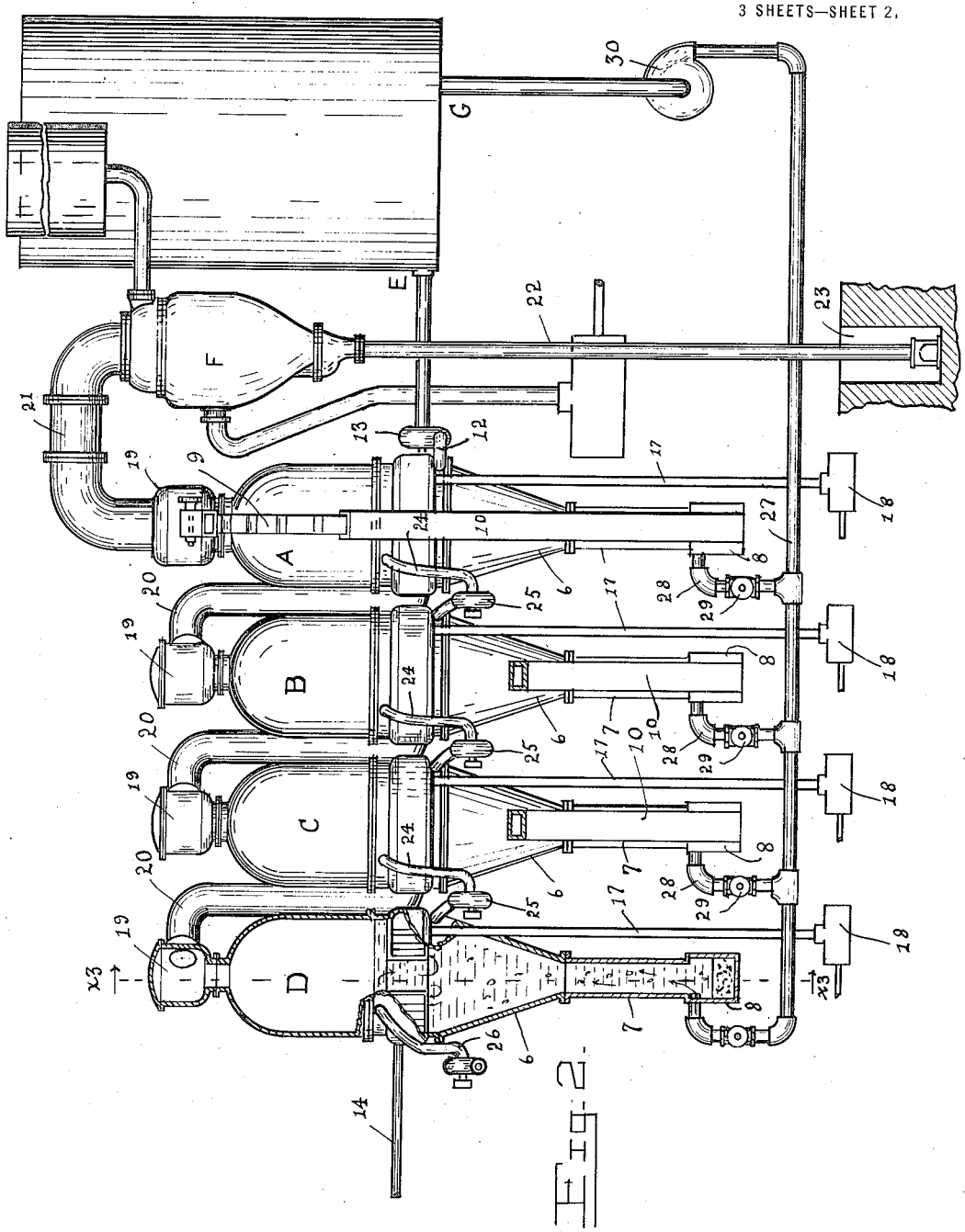

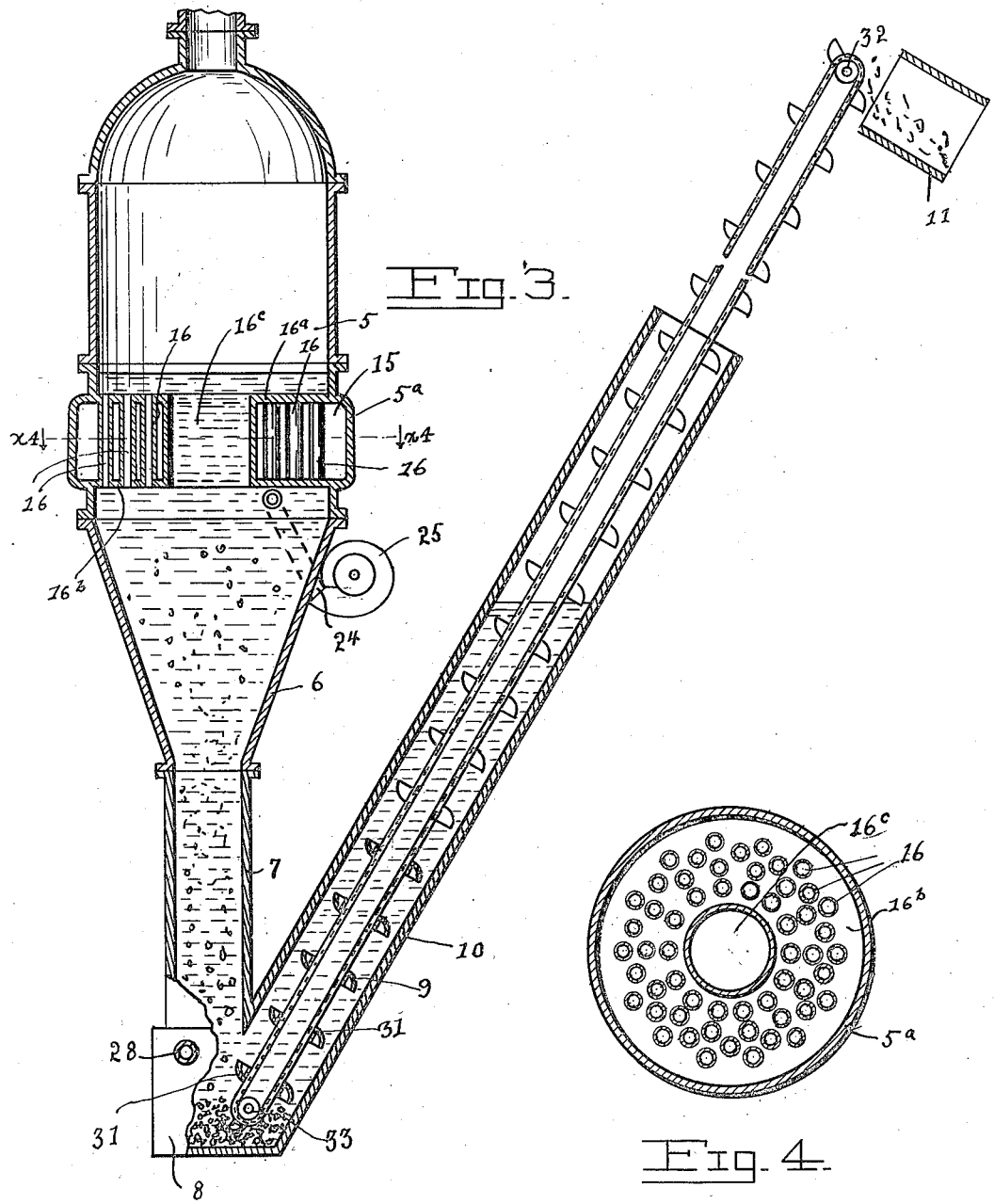

CHARLES P. GRIMWOOD, OF LOS ANGELES, CALIFORNIA.

APPARATUS FOR THE RECOVERY OF THE CONTENTS OF LIQUIDS.

1,348,409.        Specification of Letters Patent.        Patented Aug. 3, 1920.

Application filed July 15, 1916. Serial No. 109,509.

*To all whom it may concern:*

Be it known that I, CHARLES P. GRIMWOOD, a citizen of the United States, residing at Los Angeles, in the county of Los Angeles and State of California, have invented new and useful Improvements in Apparatus for the Recovery of Contents of Liquids, of which the following is a specification.

This invention relates to apparatus for the recovery of content of liquids, and more particularly for separating salts from liquids such as from natural brines of the order of the Searles Lake brines of California. While the invention is not limited to the recovery of such salts, such as potassium chlorid and sodium chlorid, the apparatus will be described particularly with reference to such recovery or separation merely as one function thereof or one use for which such apparatus is particularly adapted.

Previous attempts have been made to recover such content of brines and the like, and patents have been issued for apparatus and processes pertinent thereto, and comprising one or more effects or units in each of which a partial separating action, usually by evaporation, takes place. In accordance with the present invention a plurality of such effects or units are employed, and at and through the agency of each of the same certain of the content of the brine or the like is separated and isolated or withdrawn, such for instance as sodium chlorid and the baser salts, the higher values being thus concentrated step by step in the liquid as it passes from effect to effect, by elimination of the other salts, such higher values being finally discharged from the apparatus in highly concentrated form. In carrying out the invention, I provide an outlet for each of the effects or units through which such lower values are withdrawn, or such values or salts which it is desired to eliminate from the liquor in order that the values or salts particularly sought for may be concentrated step by step in the progress of the liquor through the apparatus for final discharge in highly concentrated form. Further in contradistinction from processes and apparatus heretofore utilized in separating such values from liquor, I subject one or more of the effects or units to relatively high temperature, causing a production of vapors in such effect or effects, which pass therefrom to the next effect in sequence, such transferred vapors acting upon the contents of the so-entered effect and producing vapors which pass over to the next effect in order and so on through the series, diminishing the liquid bulk. Likewise vacuum or relative vacuum conditions will occur in the several effects ranging from the lower vacuum condition in the effect immediately or directly heated to a higher or highest vacuum condition in the effect most remote therefrom. The intake of fresh liquor preferably takes place at the effect most remote from the effect so directly heated. It therefore occurs that the descending scale of vacuum tension, and the rising scale of temperature, coincide with the direction of flow of the liquor, assisting such flow or acting auxiliary to such means as are provided for positively causing such flow from effect to effect. While I do not claim to have originated the heating of the effects to produce the varying vacuum conditions therein, I claim that it is novel to combine or associate with such heating of the effects and of the series thereof the progressive supply of liquor from effect to effect and in a direction from the high vacuum and low temperature effect toward the low vacuum and high temperature effect; either with or without that important feature of this invention which relates to the withdrawal from each of the effects of those lower values which it is desired to eliminate from the liquor to produce a highly concentrated value, for final discharge from the apparatus, of the content of highest solubility under increasing temperature.

It will be seen that the invention contemplates the gradual enriching of the liquor as it progresses from effect to effect throughout the series, by elimination progressively of that portion of the content which, when isolated and discharged, leaves finally the residue content being the value sought to be recovered in highly concentrated form.

The invention therefore has for its objects, in addition to the general features above outlined, the provision of apparatus of the character under discussion which will be superior in point of relative simplicity and inexpensiveness of organization and construction taken together with compactness in form, positiveness and rapidity of isolation of the desired values, thoroughness and dependability as to separation along the lines of recovery desired, and in economy in fuel or energy, which will require but a minimum of attention and repair or replacement for long continued use and service, and which will be generally superior in efficiency and serviceability.

With the above and other objects in view the invention consists in the novel and useful provision, formation, combination, association, inter-relation and connection, and relative arrangement of parts, members and features, all as hereinafter described, shown in the drawings and finally pointed out in claims.

In the drawings:

Figure 1 is a top plan view of apparatus constructed and organized to embody the invention in one form;

Fig. 2 is a vertical longitudinal sectional view, partly in elevation, of the apparatus shown in Fig. 1;

Fig. 3 is a detail vertical transverse sectional view, this view being upon an enlarged scale; and, Fig. 4 is a detail transverse sectional view.

Corresponding parts in all the figures are designated by the same reference characters.

Referring with particularity to the drawings, A, B, C and D designate respectively the several effects or units of apparatus organized to embody the invention, the same being arranged in a series in close grouping for economy of space, and comprising each a main or upper cylindrical casing 5 provided with a downwardly tapering base member 6 the interior of which communicates directly with the respective casing 5, and is in turn directly in communication with a tubular leg, 7, terminating at its lower end in turn in a suitable boot 8 into which extends the path of operation of a suitable chain and bucket conveyer 9 inclosed within an upwardly ranging housing 10 provided at its upper end with a discharge spout 11. The interior of the casing 5 with its nether extremity 6 and of the tubular leg 7 and the boot 8 constitutes one continuous working chamber within which the several operations incident to the performance of the functions of the respective unit or effect A and its adjuncts take place.

The raw liquor is supplied to the highest vacuum effect A at the bottom zone of the casing 5 by a suitable supply pipe 12 which is interrupted to include a suitable force pump 13 of any preferred type, the supply coming from any suitable container or source indicated at E. Steam is supplied to the effect D or the lowest vacuum unit through a suitable steam pipe 14 which directly enters a vapor belt or chamber 15 provided by enlarging the casing 5 adjacent to its lower end, or, as specifically shown in the drawing, by building into such casing 5 a vapor belt casing $5^a$ which likewise carries a plurality or nest of vertically-disposed spaced tubes 16 which are located in upper and lower vapor casing heads $16^a$ and $16^b$ respectively, such casing $5^a$ with its tubes simulating a steam boiler construction, but being interrupted centrally to accommodate a cylindrical vertical tubular member $16^c$ providing for a more effective and voluminous circulation of fluid within the casing 5 while being subjected to the action of the steam supplied to the vapor chamber 15. The heat of the steam is of course applied to the outer walls of the tubes 16 thermally affecting the fluid as it courses through such tubes, and setting up ebullition therein, such action likewise of course taking effect with respect to the liquid within the tubular member $16^c$. From a point preferably diametrically opposite to the point of connection of the steam supply pipe 14 with the vapor chamber casing $5^a$, and from the bottom of such casing $5^a$ extends a downwardly ranging drain or discharge pipe 17 through which the water of condensation into which the steam in the chamber 15 is converted passes, being forcibly withdrawn through such pipe by a suitable exhaust pump 18.

At the top of each of the effects is provided a steam dome 19 within which collects the steam generated in the respective effect by the boiling of the liquid therein as above referred to, the steam from each such steam dome passing over through a steam pipe 20 to the steam belt or chamber 15 of the next adjacent effect, calculating in a direction from low vacuum effect to high vacuum effect, and whereby vapor generated in the effect D passes to the steam belt of the effect C, and so on from C to B, and B to A, from which last named effect or the steam dome 19 thereof a steam pipe 21 leads to a condenser F, of any preferred or suitable type, where such steam is condensed and the water of condensation led away through a discharge pipe 22 to a well 23.

The construction of all the effects is the same with respect to the provision of the steam chamber or belt 15 with its tubes 16 and central passage $16^c$, and similarly each such effect is provided as to its steam belt casing $5^a$ with a similar discharge pipe 17 for the waters of condensation, each such discharge pipe 17 being similarly provided with an exhaust pump 18, which pumps may be driven from a single prime mover but are rated differently to correspond to the different loads to be carried, such loads being in proportion to the varying vacuum stresses, as between the low vacuum effect D, the high vacuum effect A and the intermediate vacuum effects B and C.

The raw liquor is introduced to the effect A through the feed pipe 12 and to the casing 5 thereof just below the steam chamber casing 5ª. After it has been acted upon within the effect A in the manner hereinafter described, and certain values have been eliminated therefrom in such activities, such liquor passes over to the next effect in order, B, having its egress from a point of the casing chamber within the casing 5 slightly above the steam belt casing 5ª of such effect, and being withdrawn forcibly therefrom through a cross connection or transfer pipe 24 which is interrupted to include a force pump 25, the liquor so transferred to the effect B entering the same slightly below the respective steam chamber 15. A similar cross connection or transfer pipe 24 with a similar force pump 25 is provided between the effect B and the effect C, connecting zones of such effect B and effect C which correspond in location with the zones of the effects A and B similarly connected. A similar cross connection or transfer pipe 24 and force pump 25 are provided, similarly connecting, at corresponding zones, the effect C and the effect D. The liquor is acted upon as hereinafter set forth successively in the several effects, as such liquor passes from the effect A through the effects B and C and to and through the effect D, the final product of the apparatus resultant upon the final treatment therein in the effect D issuing from the latter through a discharge pipe 26, as the desired higher value in highly concentrated form. Other values, such as lower value salts, are withdrawn from each of the effects at the lower end thereof, and carried off by the conveyer 9 to be discharged through the spout 11.

At the lower end of each of the effects raw liquor is introduced, being conveniently fed to all of the effects through a header 27 provided with branch pipes 28 each having a regulating valve 29, and which branch pipes extend each to one of the boots 8. The header 27 may be provided with a feed pump 30 for forcing the liquor to the several effects, and such liquor is drawn from a suitable tank or source of supply G. The buckets of the conveyers 9 are preferably perforated as at 31 to permit the liquid to escape therefrom, the buckets carrying away the solids or crystalline deposits accumulating in the boots 8. Each conveyer chain plays about an upper sprocket wheel 32 and a lower sprocket wheel 33, each of the upper sprocket wheels being driven by a chain 34 applied to a drive sprocket 34ª fast upon a short shaft 35 carrying the respective conveyer sprocket 32, there being provided a suitable motor for operating each of the chains.

The operation, method of use and performance, and the advantages and results incident thereto may readily be understood by one skilled in the art from the foregoing description taken together with the drawings, and particularly in view of the following statement:—

The process or sequence of steps which is carried on or which occurs in the use of the apparatus disclosed in one embodiment herein, constitutes the subject of a separate companion application for Letters Patent filed herewith. As to the specific disclosure herein, it will be understood that a suitable supply of liquor is provided by the pump 13 through the pipe 12 and into the effect A, which it enters below the steam belt 15, and is maintained at a level within the casing 5 dependent upon the rate of supply of such liquor. It is not intended that the raw liquor introduced through the respective pipe 28 to the boot 8 which of course communicates with the working chamber of the effect shall be depended upon for a supply of liquor to be acted upon within the effect. This supply is only incidental. Such liquor enters the effect A, in the main, and this is equally true of all of the other effects, through the supply pipe 12, as to the effect A, and through the several respective transfer pipes 24 connecting the other effects. Thus these low level volumes of liquor in the several effects are not primarily intended to be acted upon for purposes of concentration within the effect, such concentrating action taking place with respect to the upper levels of the liquor at and adjacent to the respective steam belt. The action of all steam belts is the same with respect to the liquor entering the respective effects, with the exception that the degree of heat varies, lowering progressively from the effect D toward the effect A. The steam entering each such steam belt 15 heats up the tubes 16 and the walls of the central chamber 16ᶜ, which heat is imparted to the liquor in such chamber and pipes, raising the temperature thereof to the boiling point, and causing the separation from the liquor and the deposition in the respective effect of the crystalline formations or solids which are thus eliminated from the liquor due to decreasing volume consequent upon conversion of the water of the liquor into steam. These eliminated products or precipitates, such as they may be, as for example sodium chlorid crystals, fall into the boot 8 of the respective effect; whence they are delivered to and through the respective discharge spout 11 of the respective conveyer 9.

As such crystals are precipitated in the respective effect they are subjected to the action of the enveloping raw liquor supplied at the bottom of such effect through the supply pipe 28, and such raw liquor washes the same, removing from each crystal the envelop or film of concentrated liquor, which has been developed in the concentrating action to a point of close approach to crystalline form. This of course must not be discharged with the completed crystals, and contains of course substances foreign to the nature of the completely isolated crystals, and must be retained in the effect for further concentrating action and subsequent treatment in the further effects such as there may remain in the series of effects. The raw liquor introduced at the bottom of each effect thus and for such purposes removes such highly concentrated liquor from the crystals and conserves the same within the effect for such further treatment.

The various substances contained within the liquor passed to and through the several effects for concentration are of varying solubility with relation to varying temperatures of the liquor, and it therefore results that as the liquor progresses through the series of effects from the coolest high vacuum effect toward and to the warmest low vacuum effect, the content or value of highest solubility with relation to a given temperature will remain longest in solution in the liquor. As the temperature of the liquor rises progressively in the traverse of the steam through the effects in the direction last recited, and the volume of a given quantity of liquor progressively diminishes, the various substances in solution will be eliminated or forced from the solution in an order in the inverse ratio to the solubility of such substances, all with respect to temperature conditions. In dealing with liquors such as that obtained from Searles Lake, in practising the invention, the salts of lower solubility, such as sodium chlorid and the like, will be precipitated out of the liquor in the concentrating action which takes place in the successive effects, leaving the potassium chlorid, etc., content, with its higher solubility with relation to temperature, in solution in the remaining liquid or residue of mother liquor, and being discharged while in solution therein from the high temperature low vacuum effect D through the discharge pipe 26 for suitable further treatment as may be desired to concentrate and eliminate the same. The final product of the apparatus embodying the invention is the liquor residue with such substance or substances of highest solubility in solution therein in highly concentrated form.

The force pumps 25 cause the passage of the liquor from effect to effect, that is from the high vacuum effect A toward and to the low vacuum effect D.

The downwardly tapering casing 6 beneath the casing 5 of each effect may be designated as a collecting cone for the precipitates in such effect, the washing of course taking place in the tubular leg 7 beneath such collecting cone.

As it is manifest that many radical departures and variations and alterations and substitutions may be made with respect to the specific disclosure of the foregoing description and statement and the accompanying drawings in practising the invention, and in adapting the same to varying conditions of use and varying environments of service, I do not desire that the invention be understood as limited to any such specific aspects and features further than as required in the proper interpretation of any of the following claims.

Having thus disclosed my invention, 1 claim and desire to secure by Letters Patent:

1. Apparatus for recovering the contents of liquids, comprising a plurality of interconnected concentrating units through which a liquor may be passed progressively for concentration, means for continuously withdrawing precipitates from the lower end of each of said units, and means for introducing raw liquor to the bottom of each of said units so as to wash such precipitates as raw liquor rises in the unit prior to the withdrawal of the precipitates, thereby removing from such precipitates any adhering partially concentrated liquor in order that the same may be conserved within the units for further concentration or withdrawal.

2. Apparatus for recovering the contents of liquids, comprising a plurality of interconnected concentrating units through which a liquor may be progressively passed for concentration, means for continuously withdrawing from each of said units solid precipitates and means for continuously supplying raw liquor to each of said units so as to wash said solid precipitates prior to the withdrawal thereof and to remove therefrom any liquor adhering partially concentrated thereto in order that the same may be conserved within the units for further concentration or withdrawal.

3. In apparatus for recovering the contents of liquids, a liquid-concentrating unit, and means for continuously washing precipitates by an auxiliary supply of raw liquor before withdrawal of the precipitates from said unit in order that any adhering partially concentrated liquid may be removed therefrom for further concentration or other withdrawal.

4. In apparatus for recovering the contents of liquids, a liquid-concentrating unit, and means for washing precipitates before withdrawal of the same from said unit in order that any adhering partially concentrated liquid may be removed therefrom for further concentration or other withdrawal; said last named means comprising a bottom chamber in uninterrupted communication with the unit, and means for introducing to said bottom chamber an auxiliary supply of unconcentrated liquid.

5. In apparatus for recovering the contents of liquids, a liquid-concentrating unit, and means for washing precipitates before withdrawal of the same from said unit in order that any adhering partially concentrated liquid may be removed therefrom for further concentration or other withdrawal; said last named means comprising a bottom chamber in uninterrupted communication with the unit, and means for introducing to said bottom chamber unconcentrated liquid; said chamber diminishing in cross sectional area downwardly.

6. An apparatus for recovering the contents of liquids including a liquid concentrating chamber provided with heating means, a leg of smaller cross section than the chamber extending downwardly therefrom and in uninterrupted communication with the chamber, a boot at the lower end of the leg, means for introducing unconcentrated liquor at the boot so that as it rises in the leg it will wash the descending precipitates, and means for removing the precipitates from the boot.

7. An apparatus for recovering the contents of liquids including a liquid concentrating chamber provided with heating means, a leg of smaller cross section than the chamber extending downwardly therefrom and in uninterrupted communication with the chamber, a boot at the bottom of the leg, means for causing an auxiliary supply of unconcentrated liquor to enter the chamber through the leg, so that said liquor will wash the precipitates as they descend through the leg by the action of gravity, and means for continuously removing the precipitates from the boot.

8. An apparatus for recovering the contents of liquids including a liquid concentrating chamber provided with heating means, a leg of smaller cross section than the chamber extending downwardly therefrom and through which the precipitates drop by the action of gravity, a boot at the lower end of the leg, the boot and leg being in uninterrupted communication with the chamber, means for introducing an auxiliary supply of unconcentrated liquor into the boot so that it will rise in the leg and wash the precipitates descending therein, and a conveyer for removing the precipitates from the boot.

9. An apparatus for recovering the contents of liquids including a liquid concentrating chamber provided with a heating means, a tapered base at the bottom of the chamber, a leg extending downwardly from the tapered base and in uninterrupted communication with the chamber, a boot at the lower end of the leg, means for introducing an auxiliary supply of unconcentrated liquor at the boot so that it will rise in the leg and wash the precipitates which drop by gravity through the leg into the boot, and a conveyer for continuously removing the precipitates from the boot.

10. An apparatus for recovering the contents of liquids including a series of concentrating units each including a chamber, means for heating the chambers to produce a successively rising scale of temperature therein and also produce a descending scale of vacuum tension therein, means for progressively passing liquor through the series of units in a direction from the high vacuum unit to the low vacuum unit and from the low temperature unit to the high temperature unit, and means for withdrawing the precipitates from the several units.

11. An apparatus for recovering the contents of liquids including a series of similar concentrating units, each including a chamber provided with a steam heating element, means for progressively passing liquor through the series of units in one direction, means for progressively conveying steam from the chamber of each unit to the steam heating element of the next unit in a direction opposite to that of the flow of liquor, means for supplying steam to the heating element of the unit from which the liquor finally emerges, a condenser receiving the steam from the chamber of the unit which the liquor initially enters, thereby bringing about a rising scale of temperature and a descending scale of vacuum tension in the chambers of the unit, and means for withdrawing the precipitates from the units.

12. An apparatus for recovering the contents of liquids including a series of similar concentrating units each including a chamber provided with a steam heating element, means for progressively passing liquor through the series of units in one direction, means for conveying steam from the chamber of each unit to the heating element of the next unit in the opposite direction, means for supplying steam to the heating element of the unit in which the liquor is finally treated, a condenser in communication with the chamber of the unit which the liquor initially enters, thereby producing a rising scale of temperatures and a descending scale of vacuum tension in the chambers of the units, legs extending downwardly from the units and in uninterrupted communication therewith, means for causing an auxiliary supply of unconcentrated liquor to rise upwardly through the legs and wash the precipitates as they descend by gravity through the legs, and precipitate removing means at the lower ends of the legs.

13. An apparatus for recovering the contents of liquids, including a series of similar concentrating units each of which includes a chamber, means for heating the chambers to different degrees and producing different vacuum tensions therein whereby there will be a rising scale of temperatures and a descending scale of vacuum tension, means for progressively passing liquor through the series of units in a direction which is the reverse of the rising scale of temperature, a downwardly extending leg in uninterrupted communication with the chamber of each of the units, means for causing an auxiliary supply of unconcentrated liquor to rise through the legs and wash the precipitates as they fall by gravity through the legs, and precipitate removing means at the lower end of each of the legs.

In testimony whereof I have signed my name to this specification in the presence of two subscribing witnesses.

CHARLES P. GRIMWOOD.

Witnesses:
ALFRED H. DAEHLER,
RAYMOND IVES BLAKESLEE.